United States Patent [19]

Fonseca

[11] 3,846,535
[45] Nov. 5, 1974

[54] METHOD FOR ABSORBING SULFUR OXIDES FROM GASEOUS MIXTURES AND REGENERATING THE ABSORBENT

[75] Inventor: Anthony G. Fonseca, Ponca City, Okla.

[73] Assignee: Continental Oil Company, Ponca City, Okla.

[22] Filed: Sept. 5, 1972

[21] Appl. No.: 285,962

[52] U.S. Cl.................. 423/242, 423/166, 423/422
[51] Int. Cl............................................. C01b 17/00
[58] Field of Search.......................... 423/242–244, 423/422, 427, 428, 166, 512

[56] References Cited
UNITED STATES PATENTS 1,294,526  2/1919  Vis...................................... 423/428
3,579,296  5/1971  Cann................................... 423/242

FOREIGN PATENTS OR APPLICATIONS
767,629  2/1957  Great Britain...................... 423/422

OTHER PUBLICATIONS

Abatement of Sulfur Oxide Emission of Stationary Combustion Sources, National Research Council, 1970, PB 192887 p. 61.

Primary Examiner—Earl C. Thomas
Assistant Examiner—Gregory A. Heller
Attorney, Agent, or Firm—F. Lindsey Scott

[57] ABSTRACT

A method for absorbing sulfur oxides from gaseous mixtures containing sulfur oxides using a sodium bicarbonate or potassium bicarbonate absorbent and regenerating the absorbent.

5 Claims, No Drawings

METHOD FOR ABSORBING SULFUR OXIDES FROM GASEOUS MIXTURES AND REGENERATING THE ABSORBENT

FIELD OF THE INVENTION

This invention relates to methods for absorbing sulfur oxides from gaseous mixtures. This invention further relates to a method for absorbing sulfur oxides from gaseous mixtures by the use of sodium bicarbonate or potassium bicarbonate as an absorbent. This invention further relates to a method for regenerating the absorbent such that useful by-products are produced.

PRIOR ART

It has long been known that in the combustion of fossil fuels and the like a serious problem is presented by the combustion of the sulfur-containing components therein. The noxious sulfur oxides produced have long been considered an environmental pollutant and in recent years considerable pressure has been brought to bear upon the users of such fuels to remove the sulfur oxides from the combustion gases exhausted to the atmosphere. Numerous methods for removing such oxides are known, however, all involve certain disadvantages and as a result the search is continuing for an improved method for economically and reliably removing sulfur oxides from gaseous mixtures.

It is known that sodium bicarbonate is effective in removing sulfur oxides from gaseous mixtures as shown in "Abatement of Sulfur Oxide Emission of Stationary Combustion Sources,"National Academy of Engineering, National Research Council, 1970, PB–192887, p. 61). A major deterrent to the wide spread use of sodium bicarbonate as an absorbent has been that heretofore no economical process for the regeneration of the sodium bicarbonate has been known. One earlier method for regenerating the sodium bicarbonate consists of the addition of hydrochloric acid to the spent sodium bicarbonate absorbent to release the sulfur oxides as a gas followed by treatment with ammonia and carbon dioxide to precipitate sodium bicarbonate. The aqueous filtrate is then contacted with CaO (lime) to release the dissolved ammonia and precipitate any dissolved sulfur oxides remaining in the aqueous filtrate. The liquid waste stream so produced contains calcium chloride, an undesirable environmental pollutant.

Another attempt at the regeneration of the sodium bicarbonate comprises treating the spent sodium bicarbonate with a steam reformed natural gas containing carbon monoxide and hydrogen at temperatures of approximately 650°C. The spent absorbent goes through a molten state thus producing sodium sulfide, hydrogen sulfide, and sulfur. Steam or boiling water and carbon dioxide are used to convert the sodium sulfide to sodium carbonate but the sodium carbonate still must be converted to the starting sodium bicarbonate absorbent.

As a result of the disadvantages associated with the foregoing methods a continuing search has been directed to the development of economical and reliable methods for the recovery of sulfur oxides from gaseous mixtures and in particular to the development of an economically attractive and reliable method for regenerating sodium bicarbonate absorbents.

OBJECTS OF THE INVENTION

It is an object of this invention to provide a process for effectively removing sulfur oxides from gaseous mixtures containing such oxides. It is a further objective of the present invention to provide a process whereby sulfur oxide is removed from gaseous mixtures by the use of a sodium bicarbonate absorbent. It is a further objective of the present invention to provide a process whereby the sodium bicarbonate absorbent when spent may be economically and effectively regenerated in such a manner that no noxious waste products are produced.

SUMMARY OF THE INVENTION

It has now been found that the objectives of the present invention are accomplished in a process for absorbing sulfur oxides from gaseous mixtures containing sulfur oxides and regenerating the absorbent comprising; contacting the gaseous mixture with an absorbent selected from the group consisting of sodium bicarbonate and potassium bicarbonate thereby producing metal sulfur oxide salts; contacting said sulfur oxide salts with a compound selected from the group consisting of ammonium bicarbonate and ammonia and carbon dioxide, thereby producing metal bicarbonate and ammonium sulfur oxide salts; separating the metal bicarbonate and said ammonium sulfur oxide salts; reacting the ammonium sulfur oxide salts with an alkaline material selected from the group consisting of alkaline earth metal oxides and hydroxides thereby producing ammonia and an alkaline earth metal sulfur oxide salt. The ammonia and the metal bicarbonate produced are optionally recycled and reused in the process.

DESCRIPTION OF PREFERRED EMBODIMENTS

In the practice of the present invention the absorbent is contacted with a gaseous mixture containing the sulfur oxides by any convenient method such as the use of fluidized beds, the positioning of the absorbent material between pads, positioning the absorbent material on selected carriers and the like. Such methods are well known in the art and need not be discussed further. Sodium bicarbonate and potassium bicarbonate are both effective absorbents for removing sulfur oxides from gaseous mixtures containing such oxides and both find ready application in the practice of the present invention. For reasons hereinafter more fully described, sodium bicarbonate is preferred over the potassium bicarbonate.

As a practical matter the sulfur oxides are found primarily in the form of $SO_2$ and as much are readily absorbed to form sodium or potassium sulfite. The spent catalyst is contacted with water to form an aqueous solution and at this point the sulfur oxides may optionally be oxidized to sulfate if necessary by passing air or other oxygen-containing gases through the aqueous mixture.

The aqueous mixture is treated with ammonium bicarbonate to precipitate the sodium or potassium bicarbonate. The ammonium bicarbonate may be formed in situ by bubbling carbon dioxide and ammonia into the aqueous solution. Both methods are effective and the choice of reactants will depend primarily upon the availability of the respective materials. The sodium bicarbonate is more readily precipitated than the potassium bicarbonate since the sodium bicarbonate is less soluble in water. In particular, sodium bicarbonate has solubility of 6.9 g. per 100 g. of water at 0°C. and 16.4 g. per 100 of water at 60°C. whereas potassium bicarbonate has a solubility of 22.4 g. per 100 g. water at 20°C. and 60 g. per 100 g. of water at 60°C. as shown in Chemical Rubber Handbook, 40th Ed., Chemical Rubber Publishing Company, 2310 Superior Avenue N.W., Cleveland, Ohio, 1959, pages 626–627 and pages 652–653. Because of the solubility differences sodium bicarbonate is preferred in the practice of the present invention and the further description of the invention will be shown by reference to the sodium bicarbonate material for simplicity. It should be understood, however, that potassium bicarbonate is also effective in the practice of the present invention although it is somewhat more soluble than sodium bicarbonate.

In a preferred method for regenerating the sodium bicarbonate the ammonium sulfur oxide salts in aqueous solution produced in the reaction wherein the sodium bicarbonate is precipitated are passed to contacting with an alkaline earth metal hydroxide or oxide. The reaction products are ammonia and alkaline earth metal sulfur oxides. The alkaline earth metal sulfur oxide may be further oxidized to the sulfate if desired and if the sulfur oxides were not oxidized earlier. The alkaline earth metal sulfates are relatively insoluble and are readily precipitated to produce alkaline earth metal sulfates. Of the alkaline earth metals calcium and barium are preferred because of the more insoluble sulfur oxide compounds formed and of these calcium is preferred since it is more readily available commercially. The other alkaline earth metals form more soluble sulfur oxide salts and are in some instances somewhat less available than the calcium containing materials. The alkaline earth metal sulfates produced are useful for wall board, landfill and the like. The ammonia produced by the reaction of the alkaline earth metal hydroxide or oxide with the ammonium sulfur oxide salts is useful as ammonia or may readily be recycled to the step wherein carbon dioxide and ammonia are used to precipitate the sodium bicarbonate earlier in the process.

It is readily seen that the products of the regeneration, namely ammonia, alkaline earth metal, sulfur oxide salts and sodium bicarbonate are all readily recycled and reused in the process or are useful as end products. None are considered environmental pollutants and as a result the noxious sulfur oxides have been removed from the gaseous mixtures with no resulting noxious products from the process wherein they were removed.

The aqueous ammonium sulfur oxide mixture produced by the precipitation of the sodium bicarbonate can optionally be oxidized and recovered as ammonium sulfate. The ammonium sulfate is useful as a fertilizer and for numerous other industrial purposes. The recovery of the ammonium sulfate may be carried out by drying, by precipitation from alcoholic solutions and the like. Such methods are well known in the art and need not be discussed further.

To produce a more desirable alkaline earth sulfur oxide product as an end product it is desirable that prior to precipitating the sodium bicarbonate the aqueous solution be filtered to remove various insolubles produced by the combustion process such as flyash, ash and the like. While such materials cause no problems in the process as they are relatively inert it is undesirable that such products be found in the end product material.

Many variations and modifications are possible within the scope of the present invention and in fact such variations and modifications may be considered obvious or desirable to those skilled in the art based upon a review of the foregoing description of preferred embodiments and the following examples and claims.

EXAMPLE I

A solution of 25.2 g. (0.2 m) $Na_2SO_3$ in 1 liter of water was prepared. 32 g. (0.4 m) of $NH_4HCO_3$ was added to the solution of $Na_2SO_3$. The resulting pH was 7.1 to 7.4 and $NaHCO_3$ immediately precipitated.

The precipitate analysis showed that the only crystalline material present was $NaHCO_3$. The material contained from 1.5 to 2.9 percent sulfur indicating that some sulfur oxide material was still present.

The sulfur oxide materials still associated with the $NaHCO_3$ do not hinder the regeneration or absorption properties of the $NaHCO_3$ but it does slightly decrease the total sulfur oxide absorption capacity of the $NaHCO_3$. It was further noted that upon filtration approximately 67 percent of the theoretical amount of $NaHCO_3$ was obtained. It will be observed that in the process described in the preferred embodiment that the $NaHCO_3$ lost in the filtrate is readily recovered with the ammonia in the aqueous filtrate from the reaction wherein the alkaline earth metal sulfur oxide is precipitated. The aqueous reaction product contains the ammonia and the unrecovered sodium bicarbonate and is readily recycled to the $NaHCO_3$ precipitation reactor for further processing.

EXAMPLE II

A solution of $Na_2SO_3$ similar to that used in Example I was prepared. 6.8 g. of ammonia and 17.6 g. of $CO_2$ was added and caused immediate precipitation of the $NaHCO_3$. The pH was 7.9 in the aqueous solution prior to precipitation. The precipitation product was analyzed and found to be quite similar to that obtained in Example I.

It is noted that the most desirable precipitation was obtained wherein the pH of the aqueous solution containing the sodium sulfur oxide salts is adjusted to a value between about 7 and about 8.

While sulfite salts have been used in the foregoing examples it is pointed out that sulfur oxides generally are removed in a similar manner by the process of the present invention.

Having thus described the invention, I claim:

1. A process for absorbing sulfur oxides from gaseous mixtures containing sulfur oxides and regenerating the adsorbent comprising sequentially:
    a. contacting said gaseous mixture with an absorbent selected from the group consisting of sodium bicarbonate and potassium bicarbonate,
    b. admixing the resulting sodium or potassium sulfite, sulfate, and combinations thereof with water and ammonium bicarbonate or ammonia and carbon dioxide,
    c. separating the resulting sodium or potassium bicarbonate and the resulting ammonium sulfite, sulfate, and combinations thereof
    d. reacting the separated ammonium sulfite, sulfate, and combinations thereof with an alkaline earth metal oxide or an alkaline earth metal hydroxide, and e. separating the resulting ammonia and the resulting alkaline earth metal sulfite, sulfate, and combinations thereof.

2. The process of claim 1 wherein said absorbent is sodium bicarbonate and sodium sulfite, sulfate, and combinations thereof are produced.

3. The process of claim 1 wherein said alkaline earth metal oxides and hydroxides are selected from the group consisting of calcium oxide, calcium hydroxide, barium oxide and barium hydroxides.

4. The process of claim 1 wherein said metal bicarbonate is recycled and reused as the adsorbent of (a).

5. The process of claim 1 wherein said ammonia from (d) is recycled to (b).

* * * * *